(12) United States Patent
Stahl et al.

(10) Patent No.: US 9,552,187 B2
(45) Date of Patent: *Jan. 24, 2017

(54) SYSTEM AND METHOD FOR DISPLAY MIRRORING

(71) Applicant: Apple Inc., Cupertino, CA (US)

(72) Inventors: Geoffrey G. Stahl, San Jose, CA (US); Ian C. Hendry, San Jose, CA (US); Kenneth C. Dyke, Los Altos, CA (US); Patrick L. Coffman, San Francisco, CA (US); Steve S. Ko, Los Altos, CA (US); Nathaniel C. Begeman, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/957,537

(22) Filed: Dec. 2, 2015

(65) Prior Publication Data

US 2016/0162249 A1 Jun. 9, 2016

Related U.S. Application Data

(63) Continuation of application No. 14/287,159, filed on May 26, 2014, now Pat. No. 9,207,903, which is a
(Continued)

(51) Int. Cl.
*G06F 13/12* (2006.01)
*G06F 13/38* (2006.01)
(Continued)

(52) U.S. Cl.
CPC ........... *G06F 3/1454* (2013.01); *G06F 3/1423* (2013.01); *G06F 3/1431* (2013.01); *G06T 3/40* (2013.01);
(Continued)

(58) Field of Classification Search
None
See application file for complete search history.

(56) References Cited

U.S. PATENT DOCUMENTS 7,450,084 B2 11/2008 Fuller
8,264,519 B2 9/2012 Lunde et al.
(Continued)

FOREIGN PATENT DOCUMENTS

EP 1672613 6/2006

OTHER PUBLICATIONS

Invitation to Pay Fees in application No. PCT/US2013/043848 mailed Aug. 1, 2013 pp. 1-7.
(Continued)

*Primary Examiner* — Elias Mamo
(74) *Attorney, Agent, or Firm* — Robert C. Kowert; Meyertons, Hood, Kivlin, Kowert & Goetzel, P.C.

(57) ABSTRACT

A computing system that supports the use of multiple displays in display mirroring mode and extended display mode may automatically determine a display mode in which to configure the system (with little or no user input) based on various characteristics of the displays in the system. For example, the system may determine that a television, projector, or other presentation type display is connected in the system, and in response, may determine that the system should be configured in a display mirroring mode, rather than in an extended display mode. The system may also determine that the presentation type display is the preferred display, and may render image content in a best (or preferred) mode for that display using its native resolution, aspect ratio or color profile. The system may then scale the rendered image content for display on other (non-preferred) displays, such as an internal display, without re-rendering it.

20 Claims, 8 Drawing Sheets

Related U.S. Application Data continuation of application No. 13/631,310, filed on Sep. 28, 2012, now Pat. No. 8,738,826.

(60) Provisional application No. 61/657,549, filed on Jun. 8, 2012.

(51) Int. Cl.
    *G06F 3/14*     (2006.01)
    *G06T 3/40*     (2006.01)
    *G06T 11/00*     (2006.01)
    *G09G 5/00*     (2006.01)

(52) U.S. Cl.
CPC .......... *G06T 3/4092* (2013.01); *G06T 11/001* (2013.01); *G09G 5/005* (2013.01); *G09G 2340/045* (2013.01); *G09G 2340/0407* (2013.01); *G09G 2340/0442* (2013.01); *G09G 2370/042* (2013.01)

(56) References Cited

U.S. PATENT DOCUMENTS

| | | | |
|---|---|---|---|
| 8,738,826 | B2 | 5/2014 | Stahl et al. |
| 9,207,903 | B2 | 12/2015 | Stahl et al. |
| 2002/0196378 | A1* | 12/2002 | Slobodin ............... G06F 3/1415 348/744 |
| 2006/0048196 | A1* | 3/2006 | Yau .................... H04N 21/2146 725/81 |
| 2006/0132473 | A1 | 6/2006 | Fuller et al. |
| 2008/0030425 | A1 | 2/2008 | Fullerton et al. |
| 2008/0231546 | A1 | 9/2008 | Li |
| 2009/0219441 | A1 | 9/2009 | Kurita |
| 2009/0309808 | A1 | 12/2009 | Swingler |
| 2010/0011285 | A1 | 1/2010 | Kawata et al. |
| 2010/0097357 | A1 | 4/2010 | Lin |
| 2010/0138780 | A1 | 6/2010 | Marano et al. |
| 2010/0299436 | A1 | 11/2010 | Khalid et al. |
| 2010/0302141 | A1 | 12/2010 | Shankar et al. |
| 2011/0032334 | A1 | 2/2011 | Raveendran et al. |
| 2011/0032338 | A1 | 2/2011 | Raveendran et al. |
| 2011/0164184 | A1 | 7/2011 | Avkarogullari et al. |
| 2012/0032783 | A1* | 2/2012 | Ahn ..................... G06F 3/1423 340/6.1 |
| 2012/0042275 | A1 | 2/2012 | Neerudu et al. |
| 2012/0072609 | A1 | 3/2012 | Rajamani et al. |
| 2012/0176396 | A1 | 7/2012 | Harper et al. |
| 2012/0306926 | A1 | 12/2012 | Millet et al. |
| 2012/0307141 | A1 | 12/2012 | Millet et al. |

OTHER PUBLICATIONS

International Search Report and Written Opinion from PCT/US2013/043848, dated Oct. 22, 2013, Apple Inc., pp. 1-20.

Extended European Search Report in Application No. 13170578.2, dated Sep. 9, 2013, pp. 1-18.

Office Action from Australian Application No. 2013205178, issued Dec. 2, 2014, pp. 1-5.

Office Action from Taiwanese Application No. 102120382, issued Jan. 9, 2015, English and Chinese versions, pp. 1-16.

Second Office Action from Chinese Application No. 201310384109.5, Dated May 17, 2016 (English Translation & Chinese Version), Apple Inc., pp. 1-15.

* cited by examiner

SYSTEM AND METHOD FOR DISPLAY MIRRORING

This application is a continuation of U.S. patent application Ser. No. 14/287,159, filed May 26, 2014, now U.S. Pat. No. 9,207,903, which is a continuation application of U.S. patent application Ser. No. 13/631,310, filed Sep. 28, 2012, now U.S. Pat. No. 8,738,826, which claims benefit of priority to U.S. Provisional Application Ser. No. 61/657,549, entitled "System and Method for Display Mirroring," filed Jun. 8, 2012, all of which are hereby incorporated by reference herein in their entireties.

BACKGROUND

Technical Field

This disclosure relates generally to the use of video displays, and more specifically to the display of images on multiple devices.

Description of the Related Art

In some situations, there is a need to display the same images concurrently on multiple displays of a computer system. For example, consider a system with a computing device having an internal display and an external interface to which an external display is coupled. This system may be used for a presentation (e.g., for a software demonstration to an audience in a large room). The presenter may wish to view the demonstration on the device's internal display while the audience views the demonstration on the external display. The presenter may configure the system to operate in this mode and/or select the resolution and/or other parameters for rendering the image content on the internal and/or external displays by explicitly specifying multiple display options using multiple user interface mechanisms.

In other situations, there may be a need to display different images on multiple displays of a computer system. For example, a system with a computing device having an internal display and an external interface to which an external display is coupled may be used by a single user running an application that displays large amounts of information. The user may wish to view the information across both the internal and the external displays (e.g., in an extended desktop mode). The user may configure the system to operate in this mode and/or select the resolution and/or other parameters for rendering different portions of the image content on the internal or external displays by explicitly specifying multiple display options using multiple user interface mechanisms.

SUMMARY

This disclosure relates to computers that include an internal display and that are also connected to one or more external displays. The computers, internal displays, and external display(s) may be configured to collectively operate in a display mirroring mode or in an extended display mode (e.g., an extended desktop mode). Embodiments of the present disclosure may allow the automatic configuration of a computer and multiple displays so that content appears best on the display on which the user would like it to appear best with little or no input from the user. In some embodiments, the computer may detect the characteristics of an external display that is connected to the computer, and may infer the intended use of the external display. For example, if the external display is a presentation device (e.g., a television or projector), the computer may infer that the intended use of the external display is for a presentation format in which the external display mirrors the internal display of the computer. On the other hand, if the external display is not a presentation device (e.g., if it is a computer monitor), the computer may infer that the intended use of the external display is as an auxiliary monitor for an extended display mode.

Embodiments of the present disclosure may allow the computer to determine which display is the preferred display and to render content so that it appears best on the preferred display. The rendered content may then be resampled, scaled, and/or its color profile translated for display on the other display(s) without re-rendering it. The computer may remember the intended use and preferred display for a specific combination of displays and may infer that the intended use and other preferences are the same when that same combination of displays is subsequently detected.

In some embodiments, when a display configuration changes (or is about to change), a display re-configure notification may be sent out in the system. Various applications may respond to the notification to accept, reject, or modify a pending change, may take advantage of a completed change, or may ignore (or be oblivious to) a pending or completed change. In some embodiments, the computer may automatically determine a display mode, a preferred display, and a preferred display mode for the preferred display, and a user may override the automatic selections through various user interface mechanisms.

Figure 1:
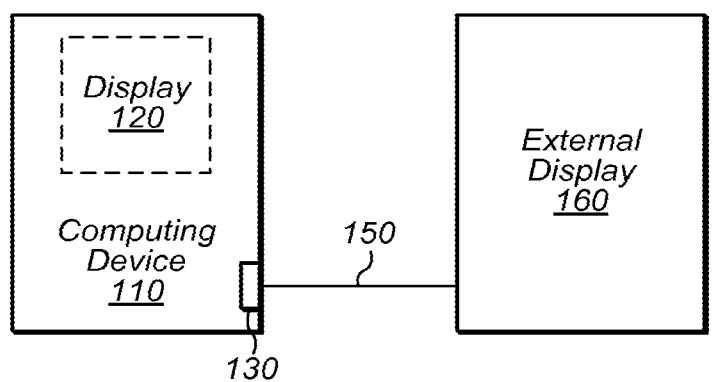
FIG. 1 is a block diagram illustrating one embodiment of a computer system having multiple displays.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

Further, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

As noted above, computing devices of various types may include an internal display and may also be connected to one or more external displays. The computing devices, internal displays, and external display(s) may, in various embodiments and in different situations, be configured to collectively operate in a display mirroring mode or in an extended display mode (e.g., an extended desktop mode). Embodiments of the present disclosure may allow the automatic configuration of a computing device and multiple displays so that content appears best on the display on which the user would like it to appear best with little or no input from the user, in accordance with the most likely use model currently being employed, as determined by the computer.

In some embodiments, a computer may detect the characteristics of an external display that is connected to the computer, and may infer the intended use of the external display based, at least in part, on those characteristics. For example, if the computer determines, based on the characteristics of the external display, that the external display is a presentation device (e.g., a television or projector), the computer may infer that the intended use of the external display is for a presentation format in which the external display mirrors the internal display of the computer. On the other hand, if the computer determines, based on the characteristics of the external display, that the external display is not a presentation device (e.g., if both the internal display and the external display are computer monitors), the computer may infer that the intended use of the external display is as an auxiliary monitor for an extended display mode (e.g., an extended desktop mode in which the internal and external monitors collectively act as a single display that is the size of the combined displays).

In some embodiments, a computer may determine which, if either, display is the preferred display and may render image content so that it appears best on the preferred display. For example, when in mirroring mode with an external display that is a television or projector, the image content may be rendered in a best or preferred mode for display on the television or projector (e.g., using a native resolution, aspect ratio, and/or color profile for the television or projector, or a derivative thereof). The rendered content may then be resampled, scaled, and/or its color profile translated for display on the internal display (e.g., without re-rendering the image content). The computer may remember the intended use and preferred display for a specific combination of displays and may infer that the intended use and other preferences are the same when that same combination of displays is subsequently detected. For example, the computer may store data indicating the display mode (e.g., display mirroring mode or extended display mode) and/or the preferred display (e.g., the internal display or an external display) for the particular combination of internal and external display(s), and may access that stored data to infer the intended use and/or other display preferences if and when that same combination of display is subsequently connected to the computer.

In some embodiments, when a display configuration changes (or is about to change) due to any of a variety of display re-configuration events (e.g., connecting or disconnecting an external display, detecting a user-initiated change in one or more display preferences, etc.), a display re-configure notification may be sent out in the system (e.g., to a user and/or to various applications that are currently executing in the system). In some embodiments, various applications (or a user) may respond to such a notification to accept, reject, or request a modification of a pending change, may take advantage of a completed change, or may ignore (or be oblivious to) a pending or completed change. In response to a rejection of a pending change by an application or a user, the computer may delay, modify, or abort a pending change.

Turning now to FIG. 1, a block diagram of a computer system with multiple displays is shown. Computer system 100 includes computing device 110, which may be any suitable type of computing device. In one embodiment, device 110 is a tablet computing device, such as an IPAD product.

As shown, device 110 is coupled to display 120. In one embodiment, display 120 is integrated or internal to computing device 110. In some of the examples described herein, this display may be referred to as the "primary" display of device 110. In some embodiments, primary display 120 may be connected to device 110 through an external interface. Display 120 is represented with a dotted line in FIG. 1 to indicate that it may be located either internal or external to device 110. Note that in some examples described herein, the primary display (i.e., the main or default display for a computing device 110) may be referred to as the "internal" display, regardless of whether it is actually integrated within the computing device or is connected to the computing device through an external interface. As used herein, the term "display" may refer to any device that is configured to present a visual image in response to control signals being provided to the display. A variety of technologies may be used in the display, such as cathode ray tube (CRT), thin film transistor (TFT), liquid crystal display (LCD), light emitting diode (LED), plasma, etc. A display may also include touch screen input functionality, or projection capability, in some embodiments. The display devices may also be referred to as panels, in some cases.

In the example illustrated in FIG. 1, in addition to display 120, computing device 110 includes an external interface 130 that is coupled to an "external" or "secondary" display 160 via connection 150. Interface 130 may be any type of standard or proprietary interface, and may be wired or wireless, in different embodiments. A given interface 130 can be understood to have a "data width" (e.g., a number of pins) that dictates how much data the interface can transfer at one time. In FIG. 1, connection 150 is a logical representation of the connection between device 110 and secondary display 160. In various embodiments, connection 150 may be wireless. In other embodiments, connection 150 may be wired, and may include one or more intervening hardware components, such as a scaling unit discussed below. Like primary display 120, secondary display 160 may be any suitable type of device. For example, in some embodiments, secondary display 160 may be a high-definition TV (HDTV) compatible device or a projection device. As described in more detail herein, an internal (or primary) display or an external (or secondary) display may at various times be the "preferred" display for a computing device 100 (i.e., the device on which the user would like image content to be displayed in a best display mode for that display).

Figure 8:
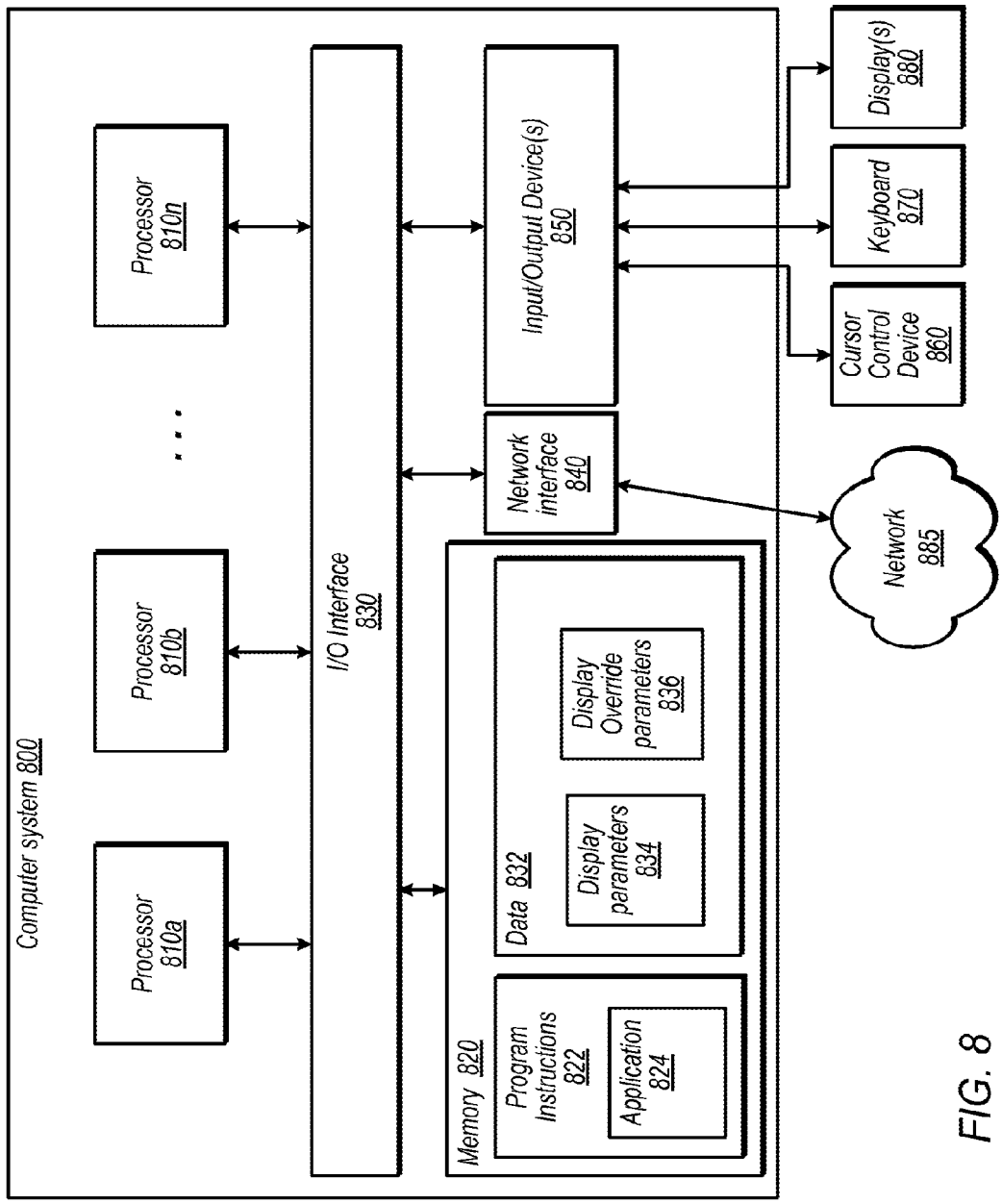
FIG. 8 illustrates an example computer system configured to implement display mirroring, according to various embodiments.

Computing device 110 may include various structures (not depicted in FIG. 1) that are common to many computing devices. These structures may include one or more processors, memories, graphics circuitry, I/O devices, bus controllers, etc. One embodiment of such a computing device is illustrated in FIG. 8 and described in detail below.

In various embodiments, computing device 110 may operate to display frames of data. Generally, a frame is data describing an image to be displayed. A frame may include pixel data describing the pixels included in the frame (e.g. in terms of various color spaces, such as RGB or YCrCb), and may also include metadata such as an alpha value for blending. Static frames may be frames that are not part of a video sequence. Alternatively, video frames may be frames in a video sequence. Each frame in the video sequence may be displayed after the preceding frame, at a rate specified for the video sequence (e.g. 15-30 frames a second). Video frames may also be complete images, or may be compressed images that refer to other images in the sequence. If the frames are compressed, a video pipeline in device 110 may decompress the frames.

In some embodiments, display generation unit within device 110 may be configured to generate (i.e. render), fetch, and/or process frame data to provide a stream of pixel values for display. The display generation unit may be configured as a display pipeline in some embodiments. Additionally, the display generation unit may be configured to blend multiple frames to produce an output frame. For example, in one embodiment, each frame pixel may have an associated alpha value indicating its opaqueness.

Generally, a pixel value in a stream of pixel values may be a representation of a pixel to be displayed on a display coupled to device 110. The pixel value may include a one or more color space values. For example, in an RGB color space, the pixel value includes a red value, a green value, and a blue value. Each value may range from zero to $2^N-1$, and describes an intensity of the color for that pixel. Similarly, in the YCrCb color space, the pixel value includes a Y value, a Cr value, and a Cb value. The location of a pixel on the display may be inferred from the position of the corresponding pixel value in the pixel stream. For example, the pixel stream may be a series of rows of pixels, each row forming a line on the display screen. In a progressive-mode display, the lines are drawn in consecutive order and thus the next line in the pixel stream is immediately adjacent to the previous line. In an interlaced-mode display, consecutive passes over the display draw either the even or the odd lines, and thus the next line in the pixel stream skips one line from the previous line in the pixel stream. For brevity, the stream of pixel values may be referred to as a pixel stream, or a stream of pixels. Pixel processing units within device 110 may be configured to perform various pixel operations on the pixel stream and may provide the processed pixel stream to the respective physical interfaces (PHYs), or display drivers. For example, pixel operations may include one or more of: color space conversions, backlight control, gamma correction, contrast ratio improvement, filtering, dithering, etc. The PHYs may generally include the circuitry that physically controls the corresponding displays. The PHYs may drive control signals that physically control the respective display panels in response to the pixel values. Thus, for example, a PHY for a display that is controlled by RGB signals may transmit voltages on the R, G, and B signals that correspond to the R, G, and B components of the pixel. There may also be a display clock that may be transmitted by the PHYs, or the display clock may be embedded in one of the control signals. Different PHYs for different displays may have clocks that are within different clock domains.

It is often desirable to use computing device 110 to make a presentation—for example, to an audience in a large room. In such a situation, the size of primary display 120 may be inadequate for audience members. To facilitate such presentations, secondary display 160 (which may be a television, a projector, or another presentation type device) may be coupled to device 110 via interface 130 and connection 150. In this manner, the presenter may view the presentation on display 120 while the audience views the presentation on display 160. In such embodiments, the two images may be displayed concurrently, such that when the presenter is describing a feature of the presentation appearing on display 120, this same feature is also appearing on display 160 at the same time. Note that there may be some inherent phase difference between images on different displays. As used herein, however, references to "synchronized," "synchronous," or "concurrent" display of images includes display of images on different displays that do not have visually discernable image drift.

Concurrent display of images becomes more difficult when the internal display and external display have different resolutions (i.e., different number of pixels in the horizontal and vertical directions). One possible solution is to have different display generation units for each display. However, such an approach may have significant drawbacks. Consider a game developer who wishes to demonstrate a new video game using internal and external displays. If the video game is pushing the processing power of device 110, it may be a waste of processing power to have a second display generation unit running for the external display, when in effect it would be rendering the same image as for the first display generation unit. Thus, such a configuration might not allow the developer the ability to showcase the video game running at peak performance.

An alternative solution is the use of a display mirroring mode in which a single display generation unit is used to provide output (e.g., pixels) to displays 120 and 160. This solution may involve rendering image data only once (or fetching rendered image data from memory only a single time), and utilizing a scaling unit or display drivers to resample or otherwise scale the rendered image data for presentation on a display other than the one for which it was rendered.

As noted above, a computer system that includes multiple displays may in some embodiments be configured to operate in a display mirroring mode or an extended display mode, at different times. When mirroring on multiple displays that have different sizes and/or resolutions, it may be difficult to efficiently provide image data to the different displays that has a pleasing appearance on all of the displays. Some current mirroring techniques may render images at a resolution that is common to both an internal display and an external display, but that may not look sharp on both displays. In some embodiments, the techniques described herein may instead optimize the resolution for a "preferred display", i.e., one on which the user would most likely prefer images to appear at their best. Note that in some embodiments, the system may automatically designate a display as the preferred display, depending on the inferred use case for the combination of displays. For example, the system may always designate a projector or television as the preferred display when it is connected in the system.

In some embodiments, the techniques described herein may provide ways to automatically manage display mirroring and various use cases for systems with both internal and external displays with little to no input from users. In other words, the techniques described herein may be employed in a computer system that is capable of supporting various display modes using multiple displays, and to automatically configure the system so that the displays present image data in a manner most likely to be the preferred manner (e.g., in a most likely display mode and/or with the image appearing at its best on the display that is most likely to be the preferred display) without manual intervention.

In some embodiments, depending on the type of external display device that is connected to a computer, the computer may be configured to automatically determine (or infer) whether to mirror the images presented on an internal or primary display of the computer on the external display device, or to share or split the presentation of images between the internal and external displays. For example, the computer may infer that it should mirror images if it is connected to a television, a projector, or another types of presentation device, as opposed to being connected to an auxiliary computer monitor. The computer may also be configured to optimize the images for display on a presentation device as the preferred one of the displays (e.g., dependent on the size, resolution, aspect ratio, and/or color profiles of the presentation device). In other words, the images may be automatically rendered in a best or preferred mode for display on the presentation device (e.g., using a GPU or other available computing facilities), and may be resampled or otherwise scaled (without being re-rendered) for display on the internal or primary display of the computer in a display mirroring mode. In general, any of a variety of techniques may be applied to perform the scaling of image content that was rendered for a preferred display (such as a presentation display) for use on a non-preferred display (such as an internal display) in order to convert the image from one size to another, with varying levels of quality and performance. For example, as noted above, the scaling may be performed by a GPU. In various embodiments, any one of a variety of different filters may be applied to down-sample the rendered image content, e.g., a bi-linear filter may be applied. In some embodiments, the system may adjust the rendered image content for differences in aspect ratios. For example, it may attempt to maintain square pixels on the output, rather than just stretching and/or compressing the image in one or more directions so that it will fit the other display. Therefore, depending on the aspect ratios of the preferred and non-preferred displays, there may be "black bars" visible across the top (and/or bottom), of the non-preferred display, or down the sides of the non-preferred display, or they may be a perfect match (e.g., if the two display have the same aspect ratios).

Note that there may also be a variety of methods for implementing the display mirroring itself, in different embodiments. For example, in one embodiment in which two displays have the same resolution, there may be two different display heads in the hardware, but they may reference the same memory, and each may scan out from that memory to a respective one of the displays. In another embodiment in which the display panels are different sizes (i.e., when they have a different numbers of pixels), there may be a hardware scaling unit that can scale the image on the fly. Note that multiple GPU vendors provide some type of panel fitter that can perform some amount of up-scaling or down-scaling, any of which may be employed in the systems described herein. In general, it may be left up to any available GPU drivers to perform the rescaling of the rendered image content for use on other displays. In some embodiments, the GPU may be given a list of rectangles when part of the screen is redrawn to them it know what has actually changed. In such embodiments, the GPU may not need to continuously resample the entire image for every single frame, which may improve performance and/or save battery life.

Figure 2A:
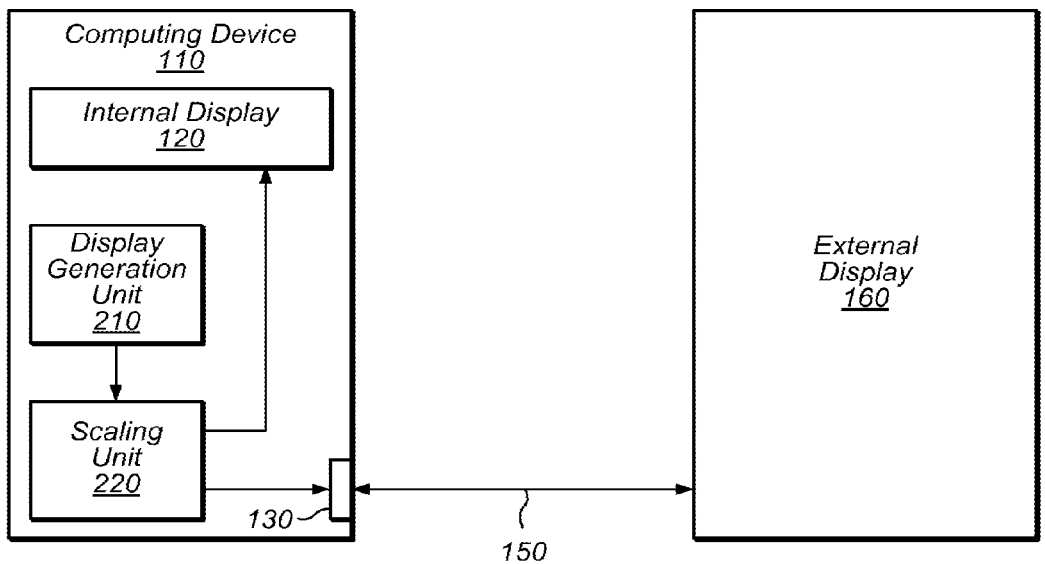
FIG. 2A is a block diagram illustrating one embodiment of a computer system that includes a computing device with an internal scaling unit.

Turning now to FIG. 2A, a block diagram of one embodiment of a computer system is depicted. Where applicable, components of the computer system have the same reference numerals as in FIG. 1. As shown, the computer system includes computing device 110, which is coupled to external display 160 via interface 130 and connection 150.

As described above with reference to FIG. 1, computing device 110 may be configured to operate in a mirror mode in which a single display generation unit provides output to displays 120 and 160. As used herein, the term "display generation unit" refers to any circuitry that may be used to generate graphics or pixel data for display, and may refer to pipelined circuitry that performs a series of graphical or pixel operations. FIG. 2A depicts a display generation unit 210 that provides output to display 120 and/or 160. While FIG. 2A shows the coupling between unit 210 and display 120 through a scaling unit 220, in other embodiments, there may be a direct connection between unit 210 and display 120 and/or different circuitry or units (e.g., a PHY unit) may reside along this path. FIG. 2A also depicts the output of display generation unit 210 being provided to external display 160 via a path that includes scaling unit 220 and interface 130. As with the connection between unit 210 and display 120, the connection between unit 210 and display 160 may have various functional units or circuitry in addition to those shown in FIG. 2A. In one embodiment, display generation unit 210 includes separate pipelines for rendering image content suitable for presentation on displays 120 and 160 (e.g., in a selected, native, or best display mode for each display). Each of these pipelines may be divided into a front end and a back end. The front ends may deal with operations such as rendering an image, scaling, color space conversion, and/or blending, while the back ends may deal with preparation of post-scaled and blended pixels for display on a panel (e.g., via dithering, etc.).

In some embodiments, in a hardware mirroring mode, the back end of the display pipeline for the secondary (or external) display may select as input the output of the front end of the display pipeline for the primary (or internal) display, or the back end of the display pipeline for the primary (or internal) display may select as input the output of the front end of the display pipeline for the secondary (or external) display. In other words, in one embodiment of display generation unit 210, the back end of the display pipelines includes a multiplexer that, during operation in mirroring mode, selects between the front-end outputs of the primary and secondary display pipelines for further processing, e.g., depending on which display is the "preferred" display. In such embodiments, the data output by the back ends of the display pipelines may or may not be further scaled by scaling unit 220 before being provided to display 120 and/or to display 160 (through external interface 130). In other embodiments, in a hardware mirroring mode, the data output by the back end of one of the display pipelines (e.g., the display pipeline for the preferred display) may be provided to both the primary (or internal) display and the secondary (or external) display, with or without additional scaling by scaling unit 220. For example, computing device 110 may render image content in a selected, native, preferred, or best mode for each of the displays, may provide the rendered content for the preferred display directly to the preferred display, and may scale (e.g., by resampling) the rendered content for presentation on the non-preferred display (without re-rendering it) before providing it to the non-preferred display. In still other embodiments, display generation unit 210 may include a single display pipeline for rendering image content for a preferred display, and the output of this single display pipeline may be scaled (e.g., by resampling) by scaling unit 210 before being provided to the non-preferred display.

In one example, computing device 110 may implement display mirroring in a situation in which external display 160 is the preferred display (e.g., when external display 160 is a television, a projector, or another presentation type device). In this example, display generation unit 210 may generate data suitable for presenting image content in a best display mode for external display 160 and may provide this data to display 160 through interface 130. In this example, computing device 110 may provide this data to internal display 120 by scaling the data in between display generation unit 210 and internal display 120 (using scaling unit 220), according to a best display mode for internal display 120 (e.g., based at least in part, on the resolution and/or aspect ratio of one of any number of native display modes). In the embodiment illustrated in FIG. 2A, scaling unit 220 may be configured to down-scale the output provided by display generation unit 210 to produce a frame to be displayed on display 120. In other embodiments, scaling unit 220 may be configured to down-scale the output provided by display generation unit 210 to produce a frame to be displayed on display 160, or scaling unit 220 may be configured to up-scale the output provided by display generation unit 210 to produce a frame to be presented on internal display 120 or external display 160 (i.e., on the non-preferred display).

Note that when computing device 110 is operating in an extended display mode, rather than in a mirroring mode, the data provided to internal display 120 and external display 160 may be different, and may be rendered by display generation unit 210 and/or scaled by scaling unit 220 to provide image data that is compatible with a best display mode (or that is based on one of any number of native display modes) for each display. Several specific examples of the results of various rendering and scaling operations are illustrated in FIGS. 3A-3C, and described below.

Figure 2B:
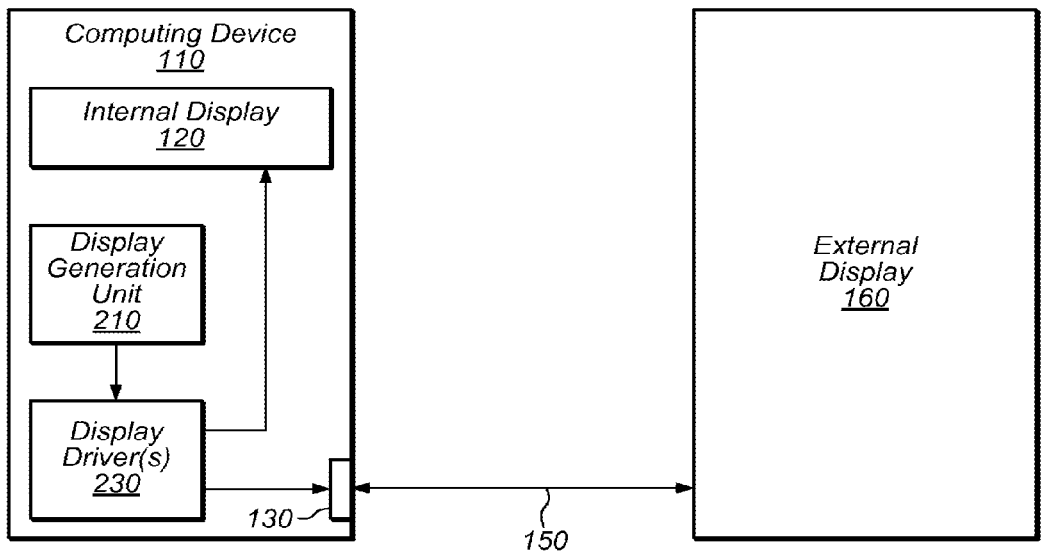
FIG. 2B is a block diagram illustrating one embodiment of a computer system that includes a computing device with one or more display drivers for use in display mirroring.

Note that in some embodiments, computing device 110 and/or display generation unit 210 may include a graphics controller or card that includes one or more dedicated graphics processing units (GPUs), and some or all of the functionality described herein as being performed by display generation unit 210 may be performed by such a GPU. Note also that while the example illustrated in FIG. 2A includes a single scaling unit 220 that is separate from a display generation unit 210, in other embodiments, multiple scaling units 220 may be included in a computing device 110 and/or such scaling units may be implemented as a component of display generation unit 210, as a component of external interface 130, or as a component of another functional unit within computing device 110. For example, in some embodiments, the scaling operations described herein (and/or other functionality, such as multiplexing operations) may be implemented by one or more display drivers 230 (which may be components of a GPU). This is illustrated by the example block diagram in FIG. 2B.

In various embodiments, a scaling unit 220 or display drivers 230 may provide data to internal display 120 and/or interface 130 that has been scaled by a horizontal scale factor and/or a vertical scale factor such that the aspect ratio of the image content presented on displays 120 and 160 is the same, and such that the resolution of the image content to be presented on each of the displays 120 and 160 is suitable for a best display mode of that display. Example methods for performing such scaling and for determining when to perform such scaling are described in more detail below.

Figure 3A:
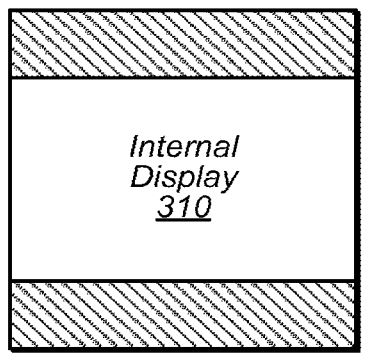
FIGS. 3A-3B illustrate examples of re-scaling image content for a non-preferred display that was rendered for a preferred display mode of a preferred display, according to some embodiments.
Figure 3A:
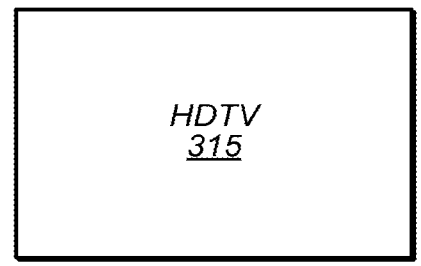
Figure 3B:
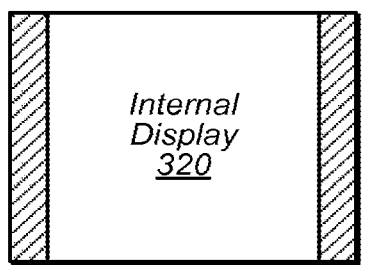
Figure 3B:
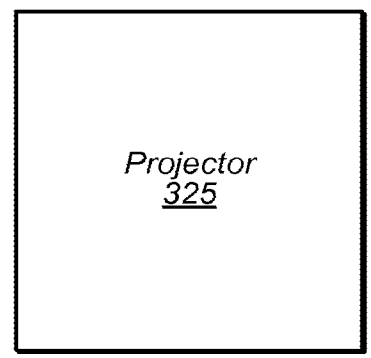
Figure 3C:
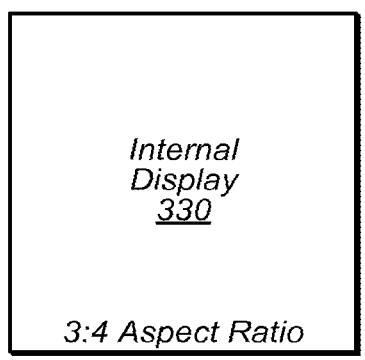
FIG. 3C illustrates an example of the display of image content on two displays in an extended display mode, according to one embodiment.
Figure 3C:
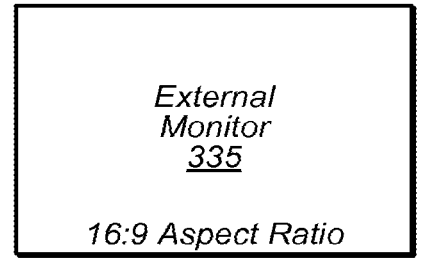

FIGS. 3A and 3B illustrate specific, non-limiting examples of the image scaling that may be performed by a computing system when operating in a mirroring mode, according to some embodiments. In these examples, image data that was rendered for a best display mode of an external display (as the preferred display) has been scaled for presentation on an internal display (as the non-preferred display). In the example illustrated in FIG. 3A, internal display 310 may be the integrated display of a tablet computing device such as an IPAD product, while external display 315 is an HDTV display, such as those commonly used for presentations. In this example, because external display 315 is the preferred display, image data is generated for a best (or preferred) mode of display 315 (e.g., according to the native resolution, aspect ratio, and/or color profile of the HDTV), such that the display area is completely filled and the image appears sharp. In this example, internal display 310 is operating in a portrait orientation and its aspect ratio (the ratio of width to height) is quite different from that of external display 315, which implements a landscape orientation. For example, external display 315 may have an aspect ratio of 16:9 (e.g., 1920×1080 pixels), while internal display 310 may have an aspect ratio of 3:4 (e.g., 1536×2048 pixels).

In this example, a scaling unit 220 (or display drivers 230) may operate to scale the image data that was generated (i.e., rendered) for display 315 to preserve an aspect ratio of the image on display 310 (i.e., the same aspect ratio at which the image is presented on display 315) at a resolution suitable for a best (or preferred) mode of display 310. The application of such scaling may allow proportionately sized concurrent images to appear on both displays (310 and 315). Because the native aspect ratio of display 310 is different from that of display 315, in this example, the scaled image may not fill the entire display area of display 310. This is illustrated in FIG. 3A by the hashed portions along the top and bottom of display 310, which indicate portions of the display not being used to display the mirrored image. In some embodiments, these portions of display 310 may appear to be "blacked out". In other embodiments, additional image information (representing portions of one or more images other than the mirrored image) may be displayed at pixels illustrated by the hashed area. Note that if the aspect ratio of an internal display 310 and an HDTV connected to the computing device as an external display 315 are the same, the images presented on internal display 310 may fill the entire display area, i.e., there may not be any "blacked out" portions of the display when operating in mirroring mode.

In the example illustrated in FIG. 3B, internal display 320 may be the integrated display of a laptop computing device, while external display 325 is an projector, such as those commonly used for presentations. In this example, because external display 325 is the preferred display, image data is generated for a best (or preferred) mode of display 325 (e.g., according to the native resolution, aspect ratio, and/or color profile of the projector), such that the display area is completely filled and the image appears sharp. In this example, internal display 320 is operating in a landscape orientation and its aspect ratio (the ratio of width to height) is quite different from that of external display 325, which implements a portrait orientation.

In this example, a scaling unit 220 (or display drivers 230) may operate to scale the image data that was generated (i.e., rendered) for display 325 to preserve an aspect ratio of the image on display 320 (i.e., the same aspect ratio at which the image is presented on display 325) at a resolution suitable for a best (or preferred) mode of display 320. The application of such scaling may allow proportionately sized concurrent images to appear on both displays (320 and 325). Because the native aspect ratio of display 320 is different from that of display 325, in this example, the scaled image may not fill the entire display area of display 320. This is illustrated in FIG. 3B by the hashed portions along the sides of display 320, which indicate portions of the display not being used to display the mirrored image. In some embodiments, these portions of display 320 may appear to be "blacked out". In other embodiments, additional image information (representing portions of one or more images other than the mirrored image) may be displayed at pixels illustrated by the hashed area. Note that if the aspect ratio of an internal display 320 and a projector connected to the computing device as an external display 325 are the same, the images presented on internal display 320 may fill the entire display area, i.e., there may not be any "blacked out" portions of the display when operating in mirroring mode.

FIG. 3C illustrates an example of the display of image content on two displays in an extended display mode, according to one embodiment. In some embodiments, in an extended display mode, the computing device may present image information on the collective display area of the two displays as if it were a single, large display having the size and shape of the combined displays. As illustrated in this example, even though the orientations and aspect ratios of internal display 330 (at 3:4) and external monitor 335 (at 16:9) are quite different, the computing device may generate and provide image information to both displays that fills the entire display area of the displays. In this example, a display generation unit 210 may render different image content for each display in a best (or preferred) mode for the display on which it will be presented (e.g., according to the native resolution, aspect ratio, and/or color profile for that display). Therefore, the images presented on each display may appear sharp and natural looking (e.g., not stretched or compressed, and having natural color profiles).

Note that embodiments of the present disclosure may be applied to any suitable combination of internal (or primary) and external (or secondary) display resolutions and/or aspect ratios, regardless of which (if either) is the preferred display at any particular point in time. In some embodiments, when the computer is operating in display mirroring mode and a particular external display is detected, an appropriate set of display parameter values (e.g., resolution, aspect ratio, and/or color profile data) for a best (or preferred) mode of the external display may be obtained from a database (e.g., a database stored in memory on the computer or in memory accessible by the computer) in which such parameters are stored. Similarly, display parameter values (e.g., resolution, aspect ratio, and/or color profile data) for a best (or preferred) mode of the internal display may also be obtained from such a database. For example, an IPAD product may include a 2048×1536 internal display, while an HDTV may include a 1920×1080 display. Note also that the techniques described herein may be applied when mirroring images that are displayed on an internal display to multiple external devices (e.g., multiple projectors, televisions, or computer monitors). In such embodiments, the system may be configured to determine (or receive input identifying) a preferred display (or a preferred display type, if multiple external displays are of the same type), to render image content in a best (or preferred) mode for the preferred display (or display type), and to resample or otherwise scale the rendered image content for display on one or more other displays (including, for example the internal display and any external displays of a type different from that of the preferred display).

Note that in some embodiments, the systems described herein may provide various user interface mechanisms through which a user may select and/or control the display mode and/or the preferred display. However, the user may not need to manipulate these controls in cases in which the system automatically (and correctly) infers the preferred display and display mode for a given combination of displays. For example, if a projector or a television is connected to the computer, the computer may assume that the user most likely wishes to display images in a display mirroring mode and also that it is most likely that the uses wishes that external display (i.e., the projector or television) to be the preferred display. In some embodiments, after the computer determines the most likely display mode and preferred display, it may optimize the display resolution, aspect ratio, and/or color profile for that display (rendering image data only once so that it appears "perfect" or "pristine" on the preferred display, i.e., so that it fills the entire display area with a 1:1 mapping between each element of the image data and the pixels of the display, and is as sharp as possible), and then may resample or otherwise scale this image data to generate a pleasing appearance (e.g., one that is as sharp as possible and/or that fills as much of the display as possible without re-rendering it) when it is displayed on the other display. While these techniques may correctly infer the preferred display mode and preferred display in a large percentage of cases, in some embodiments, a user may be able to override the choices made automatically by the computer (e.g., using a radio button or another user interface mechanism to select display mirroring mode or extended display mode, or to select an internal or external display as the preferred display). For example, in one embodiment, the system may provide (e.g., as a pop-up or pull-down) a display menu in the display(s) when operating in display mirroring mode, through which the user may disable mirroring or modify the selection of the preferred display.

Figure 5:
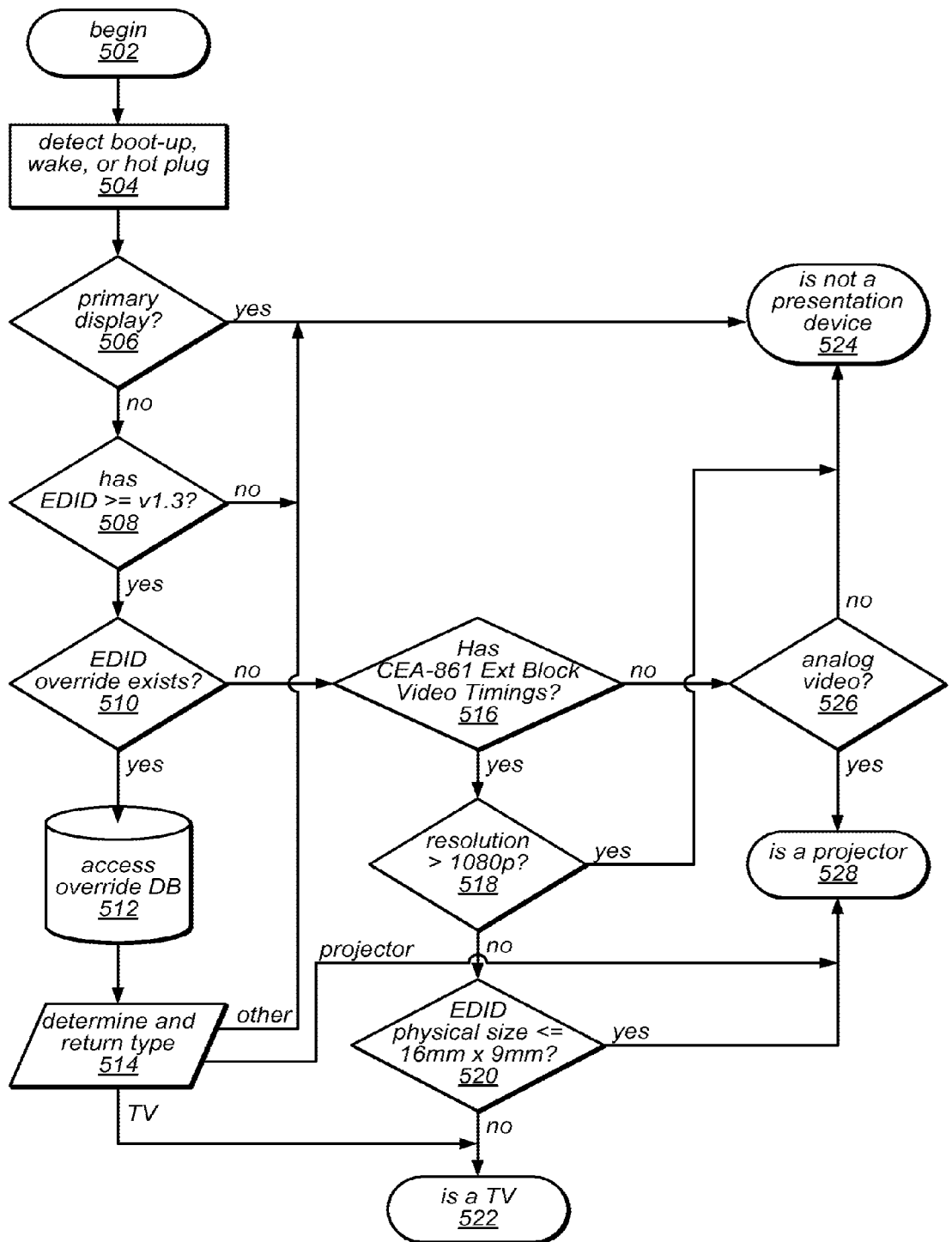
FIG. 5 is a flow diagram illustrating one embodiment of a method for determining whether a display is a presentation device.

As noted above, in some embodiments, a computer may be configured to detect the types of displays that are connected and available in the system. As illustrated in FIG. 5 and described in more detail below, in some embodiments, the computer may obtain information about the displays from the displays themselves. For example, when a computer boots up, is reset, or is otherwise initialized, or when an external display is attached to the computer, the computer may poll each of the attached displays and/or each of the attached (or newly attached) displays may be configured to provide information about itself to the system (e.g., a model number, a serial number, a manufacturing week, a list of display modes it supports, various display parameters values of each supported mode, such as the number of pixels wide by the number of pixels tall, and/or an indication of which of the supported modes is a default mode, if any). In some embodiments, such information may be provided as codes in a block of extended display identifier data information (according to an industry standard for such information) provided by a device that includes a display.

In some embodiments, data provided by a device that includes a display may be known to be incorrect. In some such embodiments, the data provided by the device may be overridden by more accurate display data that is stored in a database of display override parameter values (e.g., a database stored in memory on the computer or in memory accessible by the computer). In some embodiments, based (at least on part) on the received information, the computer may determine the best (or preferred) mode for each display. In some embodiments, the computer may propagate information about the best (or preferred) mode for each display to all other displays. For example, if a system is attached to a 1080 p display and a 1920×1200 display, information describing the 1920×1200 mode may be propagated to the 1080 p display and vice versa. In some embodiments, the best (or preferred) mode for each display (internal and external) may be the default mode for each display (e.g., when it is the preferred display). In some such embodiments, the computer may use that mode as the display mode for the preferred display (e.g., rendering image data matching the display pixels in a 1-1 mapping), and then may scale the rendered image data to be compatible with the default mode for the other display (e.g., using the resolution and aspect ratios of the default mode for the non-preferred display, or a derivative thereof, without re-rendering the image data). As described in several examples herein, this may (in some embodiments and in some cases) result in the scaled image not filling the entire display area of the other (non-preferred) display. In other embodiments, the rendered image data may be scaled such that it fills the entire display area (i.e., screen) of the other (non-preferred) display.

Note that due to differences in the resolutions of various types of devices, the rendered image data may be up-sampled or down-sampled for display on the non-preferred display. For example, common resolution levels for televisions (and/or other consumer electronics profiles) may include 1080 p and 720 p modes for TVs, while the native, default, or best resolution available on some internal displays of laptop or tablet computing devices may be much higher (e.g., 1366×768). Therefore, in a display mirroring mode in which a television is connected to a laptop computer and is the preferred display, images rendered for the television may be downscaled (e.g., down-sampled) for display on the screen of the laptop computer. Note that, in general, downscaling may require a larger buffer than upscaling because downscaling may require sampling of adjacent pixels. In some embodiments, the systems described herein may employ an optimized system for display mirroring that can downscale using either dedicated hardware or a GPU in the system, and may downscale without incurring any perceptible delays or synchronization problems. In some embodiments, this may be achieved by allowing the window system to have direct access to the back end scale buffers and allowing the window system to manage the buffers.

In general, the techniques described herein may allow a user to attach an external display to a computer, to have the computer automatically detect whether the external display is a presentation type device (e.g., a television or projector), and to have the computer automatically configure the system accordingly. For example, the computer may automatically configure the system in a display mirroring mode, and may automatically "prefers" the external display device (i.e., the television or projector), setting the desktop size for the external display and rendering images accordingly. Following this automatic configuration, there may be a perfect 1-1 pixel ratio/mapping for the external display. The images rendered for the external display may then be scaled to fit the internal display, so that it has a good (but perhaps not perfect) appearance. Similarly, the computer may set the color profile for display to the color profile for the external device (e.g., as the master color profile), and may translate or otherwise adapt the color of the rendered images according to the color profile of the internal (non-preferred) display.

Example Methods

Various embodiments of systems and methods for implementing display mirroring and/or for determining when and if to implement display mirroring may include methods that may be performed on one or more computers (such as computer system 800 illustrated in FIG. 8 below), including portable electronic devices. FIGS. 4-7 illustrate various examples of such methods.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The descriptions included herein are intended to cover such alternatives, modifications, and equivalents as would be apparent to a person skilled in the art having the benefit of this disclosure.

Figure 4:
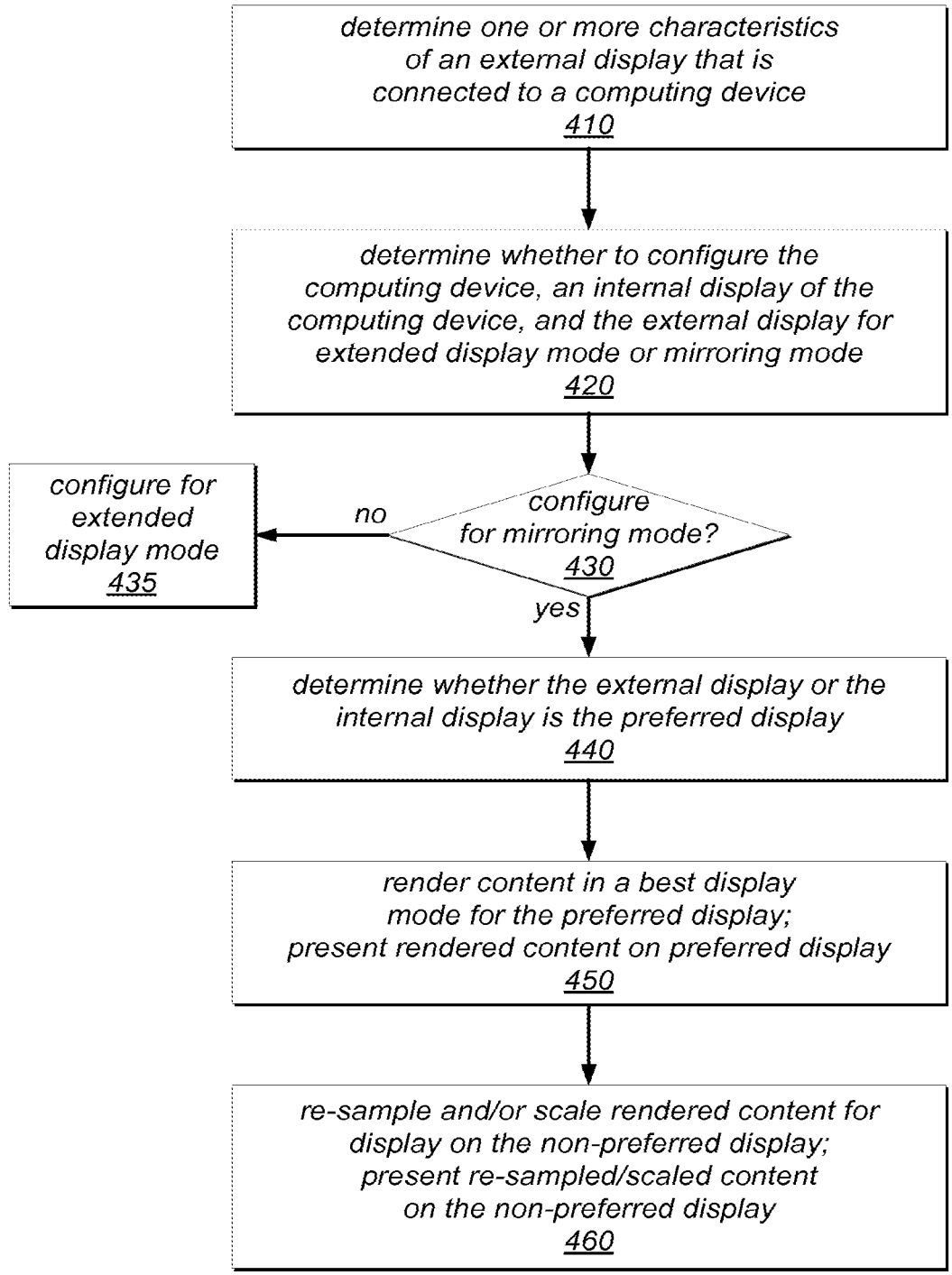
FIG. 4 is a flow diagram illustrating one embodiment of a method for implementing display mirroring.

One embodiment of a method for implementing display mirroring is illustrated by the flow diagram in FIG. 4. As illustrated at 410, the method may include determining one or more characteristics of an external display that is connected to a computing device. For example, the method may include determining whether or not the external display is a presentation display. The method may include determining (based on the determined characteristics of the display) whether to configure the computing device, an internal display of the computing device, and the external display for an extended display mode or for a display mirroring mode, as in 420. For example, if the determined characteristics of the display are consistent with those of a presentation device, the system may be configured for a display mirroring mode. Otherwise (e.g., if the determined characteristics of the display are not consistent with those of a presentation device), the system may be configured for an extended display mode (as illustrated in FIG. 4 by the negative exit from 430 and element 435).

As illustrated in this example, if the system is to be configured for a display mirroring mode (shown as the positive exit from 430), the method may include determining whether the external display or the internal display is the preferred display, as in 440. As described herein, the method may include rendering image content in a best display mode for the preferred display, and presenting that rendered image content on the preferred display, as in 450. The method may also include resampling and/or scaling the rendered content for display on the other display (i.e., the non-preferred display), and presenting the resampled and/or scaled image content on the non-preferred display, as in 460.

As previously noted, in some embodiments, determining whether a computer system should be configured in a display mirroring mode or in an extended display mode may include obtaining extended display identification data (EDID) from the display device itself, which may include manufacturing information, model and/or serial numbers, display parameter values for supported display modes, and/ or other consumer electronics profile information. Such information may be provided by various consumer electronics devices automatically (e.g., upon boot-up, during system initialization, or when it is attached in the system), or in response to being polled for this information by the system, in different embodiments.

Note that in addition to the information provided in all EDID blocks, there are various extensions to the standard that have been proposed (and in some cases largely adopted) over time. For example, most television manufacturers have implemented an extension referred to herein as a CEA-861 extension block, which includes information indicating a preferred video mode. In some cases, the preferred video mode may not be the highest-resolution mode advertised for (or supported by) a given device. For example, while a manufacturer may advertise that a particular television has the capability of supporting 1080 vertical pixels, the television may actually implement only 720 vertical pixels. Therefore, the preferred mode (which may be used as the best mode or the default mode for a television by the techniques described herein) may be the 720 p mode. Images rendered according to this mode may look better on the television that images rendered in 1080 p mode, because 720 p is the native resolution of the television, and images rendered at this resolution would not require any scaling.

In some cases, the EDID codes supplied by some devices are misleading or incorrect. For example, some LCD panels that have speakers but that are not televisions may advertise audio timings but not video timings in their EDID blocks, and may need to be treated as "not televisions". In other words, the computer may assume that such LCD panels are intended for use in an extended desktop mode, rather than for a presentation in a display mirroring mode. In some embodiments, the computer may examine the advertised size of a display (which may be included in a CEA extension block with its physical width and height being specified in millimeters). If the size is something reasonably large (e.g., significantly larger than 12 inches on the diagonal, such as 30 inches or more) the computer may assume with near certainty that the display is a television (or another large presentation display), rather than a display that would sit on the desk next to the computer as a monitor.

Note that for projectors, a standard policy is to report a width and height of zero mm, since there is no physical size associated with an image being projected. However, various projector manufacturers have incorrectly interpreted this policy to mean they should their aspect ratio (e.g., 16 mm×9 mm) should be reported in place of the width and height. In some embodiments, the computer may detect this error and assume that the display is a projector.

In some embodiments, the system may maintain a database or list of device identifiers for which one or more of the EDID codes supplied by the devices are known to be incorrect. In such embodiments, the information provided by a display device may be compared against the database or list to determine whether substitute or override parameter values (e.g., values stored in the database or list) should be used to determine the type of the display, rather than those provided by the device itself. Such a database may be stored locally in the system or may be accessible to the system over a network, and may be updated periodically or on an as-needed basis when information provided by a display device is found to be incorrect.

One embodiment of a method for determining whether or not a display is a presentation device is illustrated by the flow diagram in FIG. 5. As illustrated in this example, the method may begin (as in 502) and may detect the presence of a display in a computing system, as in 504. For example, the system may detect the presence of an internal or external display at boot-up, when the system or a particular display has woken up (or been awakened), or when a display has been recently connected to the computing system (i.e., a hot plug), in various embodiments. As illustrated at 506, the method may include determining whether the display is a primary display (e.g., an integrated or internal display, or an external display that serves as the main or default display for a computing system that does not include an integrated or internal display). If so (shown as the positive exit from 506), the method may include determining (or inferring) that the display is not a presentation device (as in 524). If the display is not a primary display (shown as the negative exit from 506), and if the version number of an EDID block received from the display is less than 1.3 (shown as the negative exit from 508), the method may include determining (or inferring) that the display is not a presentation device (as in 524).

As illustrated in this example, if the display is not a primary display (shown as the negative exit from 506), and if the EDID version number is 1.3 or higher (shown as the positive exit from 508), the method may include determining whether one or more display override parameter values are known for the display, as in 510. For example, the method may include consulting a database of display parameter values for displays for which one or more parameter values provided in their EDID blocks are known to be incorrect. If such EDID override values exist, shown as the positive exit from 510, the method may include accessing the database to obtain the override values (shown as 512), and determining and returning an indication of the presentation type dependent on the EDID parameter values received from the display and on the override values obtained from the database (as in 514). As illustrated in this example, the method may include determining (or inferring) that the display is a projector (as in 528) that the display is a television (as in 522), or that the display is another type of display (i.e., that it is not a presentation device, as in 524).

In the example illustrated in FIG. 5, if no display override parameter values are known (shown as the negative exit from 510), and the EDID block does not include CEA-861 video timings (shown as the negative exit from 516), and the display does not support analog video data (shown as the negative exit from 526, the method may include determining (or inferring) that the display is not a presentation device (as in 524). However, if the EDID block does include CEA-861 video timings (shown as the positive exit from 516), the resolution is not greater than 1080 pixels (shown as the negative exit from 518), and the physical size is greater than 16 mm×9 mm (shown as the negative exit from 520), the method may include determining (or inferring) that the display is a television (as in 522). If the EDID block does include CEA-861 video timings (shown as the positive exit from 516), and the resolution is greater than 1080 pixels (shown as the positive exit from 518), the method may include determining (or inferring) that the display is not a presentation device (as in 524).

In this example, if the EDID block does include CEA-861 video timings (shown as the positive exit from 516), the resolution is not greater than 1080 pixels (shown as the negative exit from 518), and the physical size is less than or equal to 16 mm×9 mm (shown as the positive exit from 520), the method may include determining (or inferring) that the display is a projector (as in 528). However, if the EDID block does not include CEA-861 video timings (shown as the negative exit from 516), and the display supports analog video data (shown as the positive exit from 526), the method may include determining (or inferring) that the display is a projector (as in 528).

Note that the method for determining the type of a display illustrated in FIG. 5 is just one example of such a method, and that in other embodiments, different heuristics may be applied to determine whether a display is a television, a projector, another type of presentation display, a computer monitor, or any other type of display capable of receiving image data from a computing device (or a display generation unit thereof) and presenting the corresponding images in a format appropriate for the display and for a particular use model.

As previously noted, in some embodiments, once the preferred display mode and preferred display are determined, based on the characteristics of the displays connected to a computer, the computer may be configured to render images for display in a best (or preferred) mode of the preferred display and to scale and/or translated the rendered images for display on one or more non-preferred displays. This may involve determining (e.g., based on EDID codes and/or on other stored or recently obtained information) a native, best-supported, default, or previously selected resolution, aspect ratio, color profile, size (e.g., height and width in pixels), bit depth (e.g., 16-bit or 30-bi mode), and/or rotation for the preferred display, in some embodiments. Note that in some cases, if the user wishes to display a presentation for which the user has only low-resolution image data, the computer may or may not scale the images up to the best mode resolution for the preferred display (e.g., depending on the application that is being used to present the images). For example, the images may appear best if they are not upscaled to fill the screen, but are displayed according to their native (low) resolution.

Figure 6:
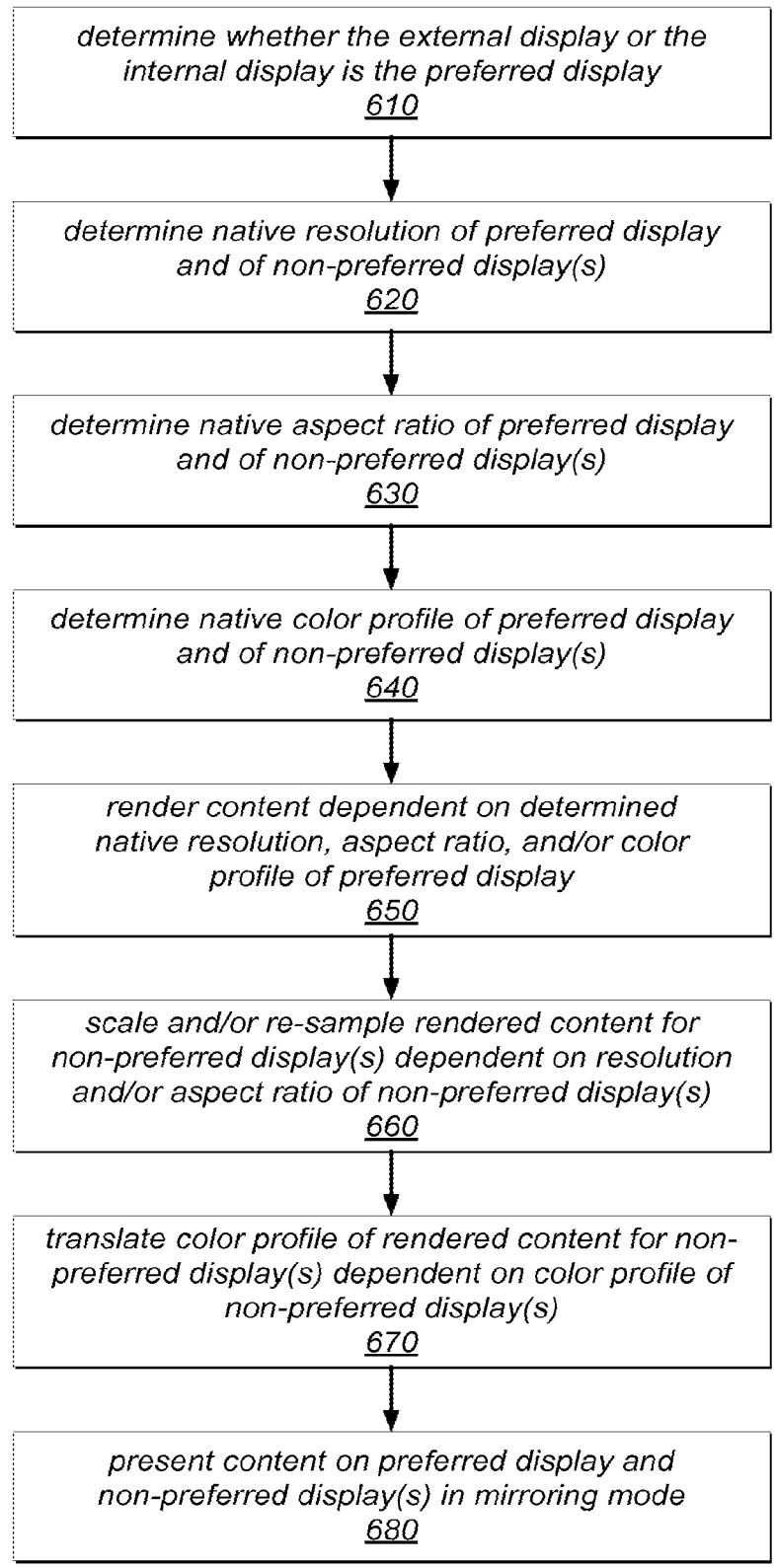
FIG. 6 is a flow diagram illustrating one embodiment of a method for displaying image content on a preferred display and mirroring the image content on another display.

One embodiment of a method for displaying image content on a preferred display and mirroring the image content on another display is illustrated by the flow diagram in FIG. 6. As illustrated at 610, in this example, the method may include determining whether the external display or the internal display is the preferred display. For example, if it has been determined that a computing device is connected to an external display that is a projection device (e.g., a television or projector), the method may include determining that the external display should be the preferred display, while if the external display is not a projection device, the method may include determining that the internal display should be the preferred display. As illustrated in FIG. 6, the method may also include determining the native resolution of the preferred display and the native resolution(s) of the non-preferred display(s), as in 620. In addition, the method may include determining the native aspect ratios of the preferred display and of the non-preferred display(s) (as in 630), and determining the native color profiles of the preferred display and of the non-preferred display(s) (as in 640). For example, in some embodiments, the method may include determining these best display mode parameters for each of the available and connected displays based, at least in part, on information received in an EDID block from the displays themselves, and/or on known information about these types of displays (e.g., information stored in one or more databases of display parameter values and/or display override parameters).

As illustrated in this example, the method may include rendering image content to be displayed on the two devices dependent on the determined native resolution, aspect ratio, and/or color profile of the preferred display (as in 650), and then resampling and/or otherwise scaling the rendered image data for presentation on the non-preferred display(s) dependent on the resolutions and/or aspect ratios of the non-preferred display(s) (as in 660) without re-rendering the image content. As described herein, resampling the rendered image data may include up-sampling or down-sampling the rendered image data, depending on the resolutions and aspect ratios of the particular internal and external displays. In some embodiments, the method may also include translating the color profile of the rendered image data for display on the non-preferred display(s) dependent on the color profile(s) of the non-preferred display(s) (as in 680). Finally, the method may include presenting the image content on the preferred display and on the non-preferred display(s) in a display mirroring mode (as in 680).

In some embodiments, the logical functions described herein for determining the types of displays connected in a computing system, determining a display mode, and/or determining a preferred display may be performed every time the system is initialized and every time an external display is attached to or detached from the system (i.e., every time a "display re-configuration event" occurs). For example, they may be performed every time a physical display is attached to or detached from the system, any time a user manually inputs some display mode information to the system (e.g., various display preferences input through one or more user interface mechanisms), or when a virtual display comes and goes. In some embodiments, the system may remember the automatically determined and/or user-defined selections unless those selections are not likely to be what the user intended to be the default configuration for the particular combination of displays (e.g., if the user explicitly selects a non-standard mode for a special use case). In one example, the system may remember that when multiple LCD panels were connected to the system, a particular one was made the desktop on the right, the internal panel was made the desktop in the middle, and another was made the desktop on the left, so that the mouse travelled across them correctly as one big extended desktop display. In some embodiments, the next time all of those panels are connected in the system, the system may assume that the user wants the same configuration and settings, and may automatically snap to that configuration.

In some embodiments, the system (or a policy engine thereof) may attempt to prevent the user from having a sub-optimal experience that they may not recognize. For example, when a projector is attached and its EDID block indicates that it supports 1080 p (which has a 19×10 aspect ratio), the system may be configured to render image data so that it looks pixel perfect up on the projector. In this case, the 1920×1080 pixels may be scaled up on the internal display (e.g., a laptop display). This may result in very obviously unused portions of the display (which may appear as black bars on the top and bottom of the display), since the laptop display has a taller aspect ratio than the external display. The system need not worry that the user may accidentally leave their machine configured in "best for external" mode if they really wanted "best for internal", as this will be obvious to the user, and the user can go into their display preferences and change the configuration to "best for internal". On the other hand, it may not be as obvious when user desires "best for external", but the system is configured as "best for internal". Therefore, in some embodiments, the system may be configured to prefer a "best for external" configuration even in situations in which the user recently specified a preference for the internal display when using the same combination of displays. In such embodiments, the selection of "best for internal" in a mirroring situation that includes a television or projector may be considered an exceptional case that a user may have to handle it themselves. However, in some embodiments, the system may be configured to recognize that such an exceptional configuration has been selected multiple times (e.g., a particular number of times in a row) for that combination of displays, and to change its behavior or prompt the user to confirm the selection of the "best for internal" mode the next time that combination of displays is detected.

Note that when a virtual display is attached or enabled in the system (e.g., if a user plugs in a virtual television on the local network and it is attached to a television), a virtual television may become available that the user could potentially mirror to or could potentially use in an extended desktop mode). In that case, since it is essentially a television, they system may default to a display mirroring mode, but the user may be able to uncheck "mirroring" in a display menu in order to use the virtual television for a second display (e.g., across the room) as part of an extended desktop.

As previously noted, in some embodiments, the systems described herein may allow a user to override the decisions made automatically by the system. For example, in some embodiments, when an external display is attached to a computer, a "display extras" menu may be displayed (e.g., as a pop-up), and the user may be able to select this menu (e.g., by "mousing over it") to modify one or more of the automatically determined choices (e.g., the display mode, the preferred display, and/or one or more display parameters thereof). In some such embodiments, instead of presenting the user with every possible mode that the system can physically display, the system may provide the user with the option to select the best mode for a particular display, or to select one of a set of scaled modes. These scaled modes may be expressed as a set of point sizes that will then be scaled to fit on the display, and they may be labeled in such a way that expresses to the user what is likely to happen on the system (e.g., "largest text" or "most pixels"). In various embodiments, details of the physical workings of the display system (e.g., vertical blanking time) may be abstracted away from the user. Note that for a laptop computer, the system may express display options in terms of points (rather than pixels) because that is how users are used to interpreting the dimensions of their screens. For television, the system may express display options as a set of TV-like resolutions (e.g., 1080 p, 1080i, or 720 p, rather than 800×600 or 1280×720). For computer monitors, the system may express display options in terms of horizontal and vertical pixels (e.g., 2048×1536).

Note that in some embodiments, a computer may send out display re-configure notifications when (or immediately prior to) making a change in the display configuration for the computer and its attached displays. In general, the system (or a policy engine thereof) may attempt to figure out what the intended display configuration is, whether the user has a preference, how the color should be managed, etc., and then may provide software running on the system a notification of the pending configuration. In such embodiments, an application that manages presentations or movie playback may listen to the display re-configure notification that goes out on the system and reply with a request to override one or more of the automatically determined choices (e.g., the preferred display, or the resolution of the preferred display). In response, the computer may make the requested modification. Similarly, a display re-configure notification may be sent out in response to a user selecting a change in a display preference (e.g., through one of various user interface mechanisms). In some embodiments, a display re-configure notification may be sent out to provide advance notice of a proposed or pending change, and/or a display re-configure notification may be sent out subsequent to making a display configuration change to indicate that the change has been made. In some embodiments and in some cases, an application that is currently executing in the system may reject a pending display configuration change, in response to which the computer may delay, modify, or abort the pending change. In other cases, currently executing applications may react to a completed display configuration change (e.g., to take advantage of the completed change by resizing the images it produces, or by migrating from a low-power graphics card to a high-power graphics card or vice versa), or may ignore (or be oblivious to) a pending or completed change. In some embodiments, applications that are interested in receiving such notifications may register to receive them. In other embodiments, the operating system and/or various functions of a system library may be registered to receive such notifications and to resize images produced by various executing applications on their behalf. Various other types of responses to notifications of pending and/or complete display configuration changes may be performed, in other embodiments.

Figure 7:
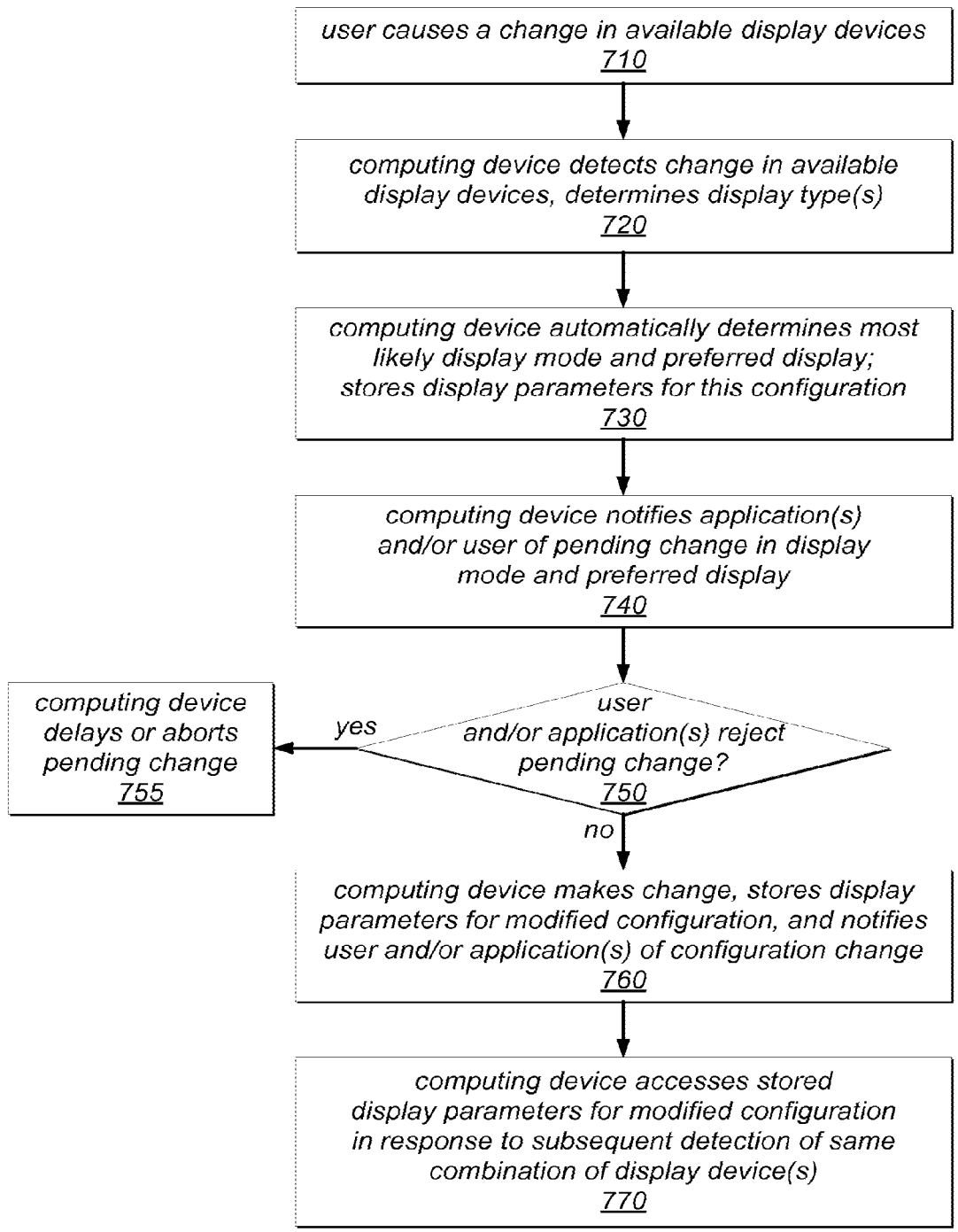
FIG. 7 is a flow diagram illustrating one embodiment of a method for configuring multiple displays in a computing system.

One embodiment of a method for configuring multiple displays in a computing system is illustrated by the flow diagram in FIG. 7. As illustrated at 710, in this example, the method may include a user causing a change in the number and/or type of display devices available and connected to a computing device. For example, the user may re-boot or awaken the computing device, connect a display to the computing device, or disconnect a display to a computing device. As illustrated in this example, the computing device may detect the change in the available display devices, and may determine the display type(s) for the available displays, as in 720. The computing device may then automatically determine the most likely display mode (e.g., a display mirroring mode or an extended display mode) and the most likely preferred display (e.g., an internal display or an external presentation type display). The computing device may then store the automatically determined display parameters for this configuration (e.g., the display mode, the native resolutions, aspect ratios, and/or color profiles for each display, and/or any other display parameter values obtained from the displays themselves or from one or more databases of such information).

As illustrated in this example, the method may include the computing device notifying one or more current executing applications and/or the user of a pending change in the display mode and/or the preferred display (e.g., if it has determined that the display mode or preferred display should change), as in 740. In some embodiments, the user and/or one or more application(s) may reject the pending change (shown as the positive exit from 750), in which case, the computing device may delay or abort the pending change to the display mode and/or preferred display, as in 755. If neither the user nor the currently executing applications reject the pending change (shown as the negative exit from 750), the method may include the computing device making the change, storing the updated display parameters for the modified configuration, and notifying the user and/or the currently executing application(s) of the configuration change, as in 760.

As illustrated in FIG. 7, the computing device may subsequently access the stored display parameters for the modified display configuration in response to detecting the same combination of display device(s), as in 770. In other words, in some embodiments, the computing device may be configured to infer that the same display parameters should be applied to configure the displays in the same manner an in the modified configuration when and if that same combination of display devices is connected to the computing device. Note that in some embodiments, the computing device may again notify the user and/or any currently executing applications that it intends to configure the displays in this way, and the user and/or applications may reject or override the inferred configuration (e.g., explicitly selecting a different display mode, preferred display, and/or other display parameters for this combination of display devices).

Note that in some embodiments, while in a display mirroring mode, an application may be able to provide unique content (if available) for one of the displays in addition to the mirrored content. For example, an application may be configured to mirror images for a presentation on a projector or television and on an internal display of a laptop or tablet device, and may also be able to simultaneously provide speaker notes only on the internal display (e.g., only if and while they are available, and only if that application is in the foreground). In some embodiments, if a system was configured for display mirroring mode, using any of the techniques described herein, but a subsequently executed application is not suitable for a presentation mode (e.g., if it is capable of providing different content for multiple attached displays), the computer may automatically determine that it should exit the display mirroring mode in favor of an extended display mode. In some embodiments, this may be implemented by the operating system through various hooks that are exposed to application developers (e.g., a hook that can be used to designate content "for internal display only", "for mirrored display", or as "primary" or "secondary" content).

Example Computer System

FIG. 8 illustrates computer system 800 that is configured to implement any or all of the embodiments described above. In different embodiments, computer system 800 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for implementing display mirroring, as described herein, may be executed on one or more computer systems 800, which may interact with various other devices. Note that any component, action, or functionality described above with respect to FIGS. 1-7 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880 (which may include an internal or primary display and one or more external or secondary displays, such as those described herein). In some embodiments, computer system 800 may implement a computing device such as that illustrated as computing device 110 in FIG. 1. As previously noted, computing device 110 and/or display generation unit 210 may include a graphics controller or card that includes one or more dedicated graphics processing units (GPUs), and some or all of the functionality described herein as being performed by display generation unit 210 may be performed by such a GPU.

In different embodiments, input/output devices 850 may include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, input/output devices 850 illustrated in FIG. 8 may also include one or more display generation units, scaling units, and/or display drivers configured to generate (render) and/or scale image content for display on various internal and/or external displays, as described herein. In some embodiments, input/output devices 850 may include circuitry for detecting connections between computer system 800 and one or more external display devices, or for receiving extended display interface data from those devices, and/or may include one or more dedicated graphics cards or graphics controllers for performing any or all of the techniques described herein. For example, a graphics controller within computer system 800 may be configured to render objects to be displayed into one or more frame buffers in system memory 820. The graphics controller may include one or more graphics processors (or GPUs) that may execute graphics software to perform a part or all of the graphics operation, and/or hardware acceleration of certain graphics operations. The amount of hardware acceleration and software implementation may vary from embodiment to embodiment.

In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. In general, processors 810 may implement any instruction set architecture, and may be configured to execute instructions defined in that instruction set architecture. The processors may employ any microarchitecture, including scalar, superscalar, pipelined, superpipelined, out of order, in order, speculative, non-speculative, etc., or combinations thereof. The processors may include circuitry, and optionally may implement microcoding techniques. The processors may include one or more L1 caches, as well one or more additional levels of cache between the processors and one or more memory controllers. Other embodiments may include multiple levels of caches in the processors, and still other embodiments may not include any caches between the processors and the memory controllers.

System memory 820 may be configured to store program instructions 822 and/or data 832 accessible by processor 810. In various embodiments, system memory 820 may be implemented using any suitable memory technology, such as dynamic random access memory (DRAM), synchronous DRAM (SDRAM), double data rate (DDR, DDR2, DDR3, etc.) SDRAM (including mobile versions of the SDRAMs such as mDDR3, etc., low power versions of the SDRAMs such as LPDDR2, etc.), RAMBUS DRAM (RDRAM), static RAM (SRAM), nonvolatile/Flash-type memory, and/or any other type of memory. In some embodiments, one or more memory devices may be coupled onto a circuit board to form memory modules such as single inline memory modules (SIMMs), dual inline memory modules (DIMMs), etc. Alternatively, the devices may be mounted with a system on a chip in a chip-on-chip configuration, a package-on-package configuration, or a multi-chip module configuration.

In the illustrated embodiment, when executed by one or more of processors 810, program instructions 822 may be configured to implement an application 824 incorporating, or taking advantage of, any of the functionality described above. For example, program instructions 822 may be configured to automatically determine a display mode and/or a preferred display based on characteristics of various displays connected to computer system 800, to control the rendering and/or scaling of image content by hardware or software in the system for display on those devices, and/or to provide images for display in a display mirroring mode or extended display mode using any or all of the techniques described herein. Additionally, data 832 of memory 820 may store values for one or more display parameters 834 and/or display override parameters 836. In other embodiments, different elements and data may be included in system memory 820. In some embodiments, program instructions and/or data may be received, sent or stored upon different types of computer-accessible media or on similar media separate from system memory 820 or computer system 800. While computer system 800 is described as implementing the functionality of functional blocks of previous figures, any of the functionality described herein may be implemented via such a computer system.

In various embodiments, memory controllers (not shown) may comprise any circuitry configured to interface to the various memory requestors (e.g. processors, graphics circuitry, etc.). Any sort of interconnect may be supported for such memory controllers. For example, a shared bus (or buses) may be used, or point-to-point interconnects may be used. Hierarchical connection of local interconnects to a global interconnect to the memory controller may be used. In one implementation, a memory controller may be multi-ported, with processors having a dedicated port, graphics circuitry having another dedicated port, etc.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

In various embodiments, different structures within computer system 800 may be located within a system on a chip (SoC). In one implementation, computer system 800 includes and integrated display (such as internal display 120), an SoC, memory, and an external interface (such as external interface 130), with the SoC coupled to the display, the memory, and the interface. Other embodiments may employ any amount of integrated and/or discrete implementations.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for controlling multiple displays by a computer, comprising:
performing, by the computer,
determining one or more characteristics of an external display that is connected to the computer;
determining, dependent on the one or more characteristics of the external display, which one of a display mirroring mode and an extended display mode should be used to configure the computer, the external display, and an internal display of the computer; and
subsequent to determining that the computer, the external display, and an internal display of the computer should be configured for a display mirroring mode:
determining which one of the external display and the internal display is a preferred display;
rendering content for the preferred display in a preferred mode for the preferred display;
providing the rendered content to the preferred display; and
providing the content for display on the other display.

2. The method of claim 1, further comprising:
presenting the rendered content on the preferred display; and
concurrent with said presenting, presenting the content on the other display.

3. The method of claim 1,
wherein said determining one or more characteristics of the external display comprises receiving data specifying one or more parameter values from the external display; and
wherein the data specifying the one or more parameter values comprises extended display identification data.

4. The method of claim 1,
wherein the one or more characteristics imply that the external display is a display of a presentation device; and
wherein said determining which one of the external display or the internal display is the preferred display comprises determining that the external display is the preferred display in response to the one or more characteristics implying that the external display is a display of a presentation device.

5. The method of claim 1, wherein said rendering content for the preferred display in the preferred mode for the preferred display comprises rendering the content dependent on at least one of a native resolution of the preferred display or an aspect ratio of the preferred display.

6. The method of claim 5,
wherein said rendering content for the preferred display in the preferred mode for the preferred display further comprises rendering the content dependent on a native color profile for the preferred display; and
wherein the method further comprises translating the color profile of the rendered content to a color profile of the other display.

7. A system, comprising:
a computing device; and
two or more displays coupled to the computing device, at least one of which is external to the computing device;
wherein, during an initialization of the computing device, the computing device is configured to:
determine which one of the two or more displays is a preferred display, dependent on one or more characteristics of one or more of the two or more displays; and
wherein, subsequent to the determination of the preferred display, the computing device is configured to:
render content representing an image for the preferred display dependent on a preferred mode of the preferred display;
provide the rendered content to the preferred display; and
concurrent with said provide the rendered content to the preferred display, provide the content to the other one of the two or more displays.

8. The system of claim 7,
wherein to determine which one of the two or more displays is the preferred display, the computing device is configured to receive data specifying one or more parameter values from the at least one display that is external to the computing device; and
wherein the data specifying the one or more parameter values comprises extended display identification data.

9. The system of claim 7,
wherein the one or more characteristics imply that the at least one display that is external to the computing device is a display of a presentation device; and
wherein to determine which one of the two or more displays is the preferred display, the computing device is configured to determine that the at least one display that is external to the computing device is the preferred display in response to the implication that the at least one display that is external to the computing device is a display of a presentation device.

10. The system of claim 7,
wherein to render content for the preferred display dependent on a preferred mode of the preferred display, the computing device is configured to render the content dependent on a native color profile for the preferred display; and
wherein the computing device is further configured to translate the color profile of the rendered content to a color profile of the other one of the two or more displays.

11. The system of claim 7, wherein the computing device is further configured to:
store an indication that presentation of the content was made in a display mirroring mode and an indication of the preferred display for the combination of the two or more displays; and
in response to a subsequent detection of the same combination of displays, determine that content representing another image should be presented in a display mirroring mode in which a display that is external to the computing device is the preferred display.

12. The system of claim 11,
wherein the computing device is further configured to:
receive input specifying that the display mode should not be a display mirroring mode or that the display that is external to the computing device should not be the preferred display; and
render, resample, scale, or present the content representing the other image on one or more of the two or more displays in accordance with the received input.

13. The system of claim 7, wherein to render the content for the preferred display dependent on a preferred mode of the preferred display, the computing device is configured to render the content dependent on a native resolution or a native aspect ratio of the preferred display.

14. A method, comprising:
determining, by a computing device of a computing system, one or more characteristics of the computing system;
subsequent to said determining,
determining, by the computing device and based at least in part on the one or more characteristics of the computing system, to display content to a presentation type display of the computing system and to another display of the computing system, wherein the other display is of a type other than a presentation type display;
rendering, by a display generation unit of the computing device, content for display on the presentation type display;
resampling or scaling the content that was rendered for the presentation type display for display on the other display without re-rendering the content;
providing, by the computing device, the rendered content to the presentation type display; and
providing, by the computing device, the resampled or scaled content to the other display.

15. The method recited in claim 14,
wherein said determining one or more characteristics comprises receiving data specifying one or more parameter values from the presentation type display; and
wherein the data specifying the one or more parameter values comprises extended display identification data.

16. The method recited in claim 14,
wherein the one or more characteristics imply that the presentation type display is a display of a presentation device; and
wherein said determining to display content to the presentation type display of the computing system comprises determining that the presentation type display is a preferred display in response to the one or more characteristics implying that the presentation type display is a display of a presentation device.

17. The method recited in claim 16, wherein, in response to the implication that the presentation type display is a display of the presentation device, the computing device is configured to determine that content should be presented by the computing device in a display mirroring mode rather than in an extended display mode.

18. The method recited in claim 14, wherein said content for display on the presentation type display further comprises rendering the content dependent on at least one of a native resolution of the presentation type display or an aspect ratio of the presentation type display.

19. The method recited in claim 14,
wherein said content for display on the presentation type display further comprises rendering the content dependent on a native color profile for the presentation type display; and
wherein the method further comprises translating the color profile of the rendered content to a color profile of the other display.

20. The method recited in claim 14, wherein at least some of the determined one or more characteristics of the computing system is obtained from the presentation type display as part of an extended display identification data (EDID) data block.

* * * * *